United States Patent [19]
Block

[11] 3,881,354
[45] May 6, 1975

[54] FLUID VELOCITY RESPONSIVE INSTRUMENT

[76] Inventor: Sheldon L. Block, 9517 Woodley Ave., Sepulveda, Calif. 91314

[22] Filed: Apr. 17, 1973

[21] Appl. No.: 352,012

[52] U.S. Cl. ............................................. 73/228
[51] Int. Cl. .......................................... G01f 1/00
[58] Field of Search ........................... 73/228, 207

[56] References Cited
UNITED STATES PATENTS

| | | | |
|---|---|---|---|
| 720,188 | 2/1903 | Seidener | 73/228 X |
| 3,119,262 | 1/1964 | Wright et al. | 73/228 |
| 3,218,854 | 11/1965 | Brown | 73/228 |
| 3,766,779 | 10/1973 | Hoffman | 73/228 |

FOREIGN PATENTS OR APPLICATIONS

| | | | |
|---|---|---|---|
| 1,444,204 | 5/1966 | France | 73/228 |

Primary Examiner—Jerry W. Myracle

[57] ABSTRACT

A velocity responsive instrument which is responsive to velocity of flow of a fluid medium, but not pressure. A movable member is mounted to be movable whereby it is moved by fluid medium in the direction of flow. The member is preferably biased by a spring. It responds only to velocity of flow and may be embodied as a flow switch, flow meter, transducer, or otherwise.

2 Claims, 6 Drawing Figures

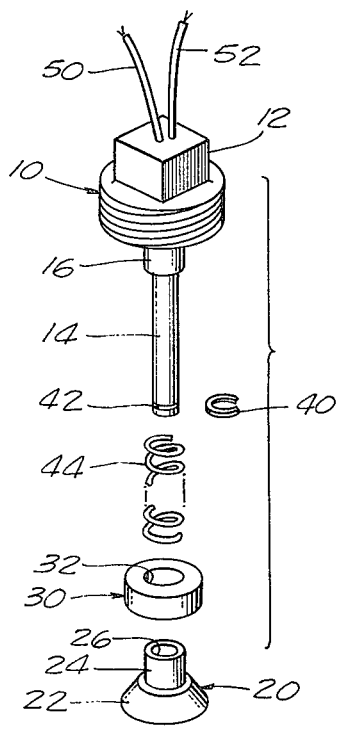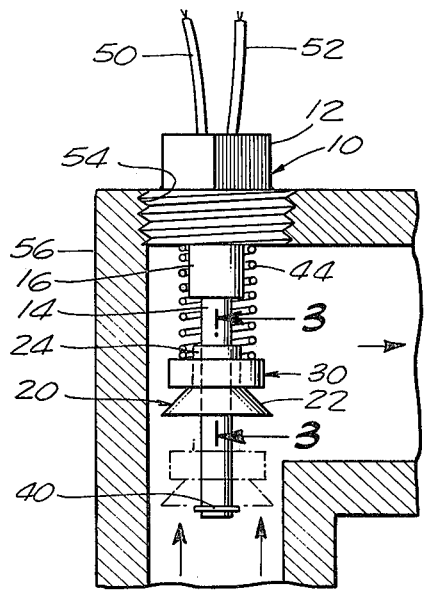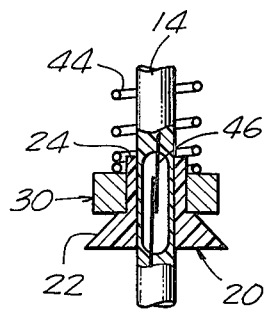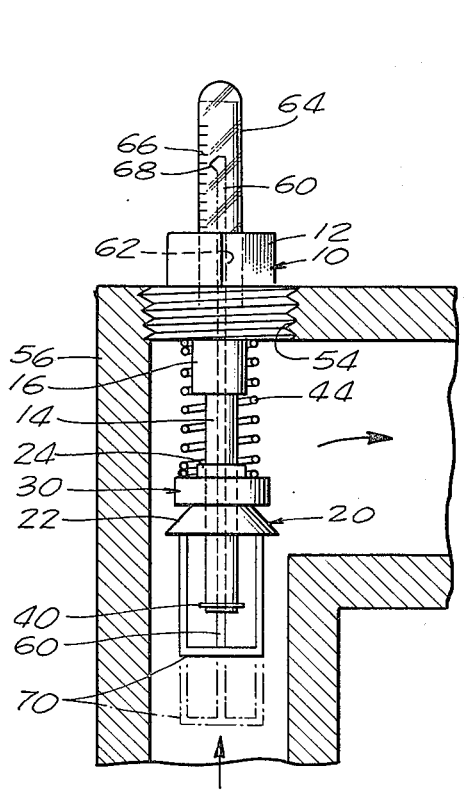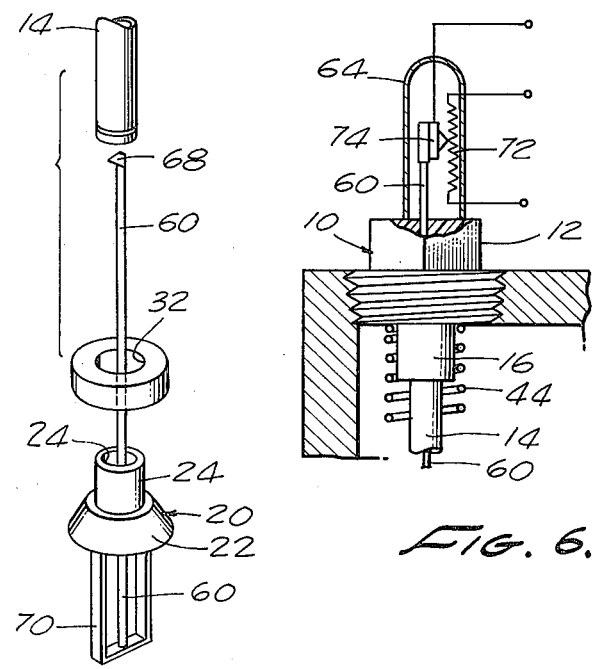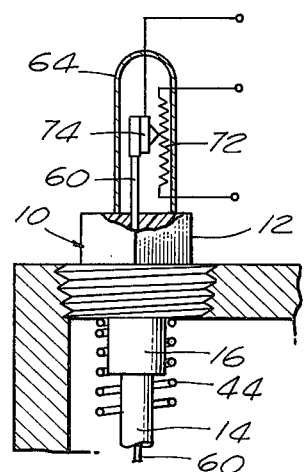

FLUID VELOCITY RESPONSIVE INSTRUMENT

SUMMARY OF THE INVENTION

The invention is a velocity responsive instrument which is responsive to velocity of flow of a fluid medium without being responsive to pressure.

The instrument is based on the discovery that a member can be mounted in the path of flow of a moving fluid medium, whether liquid or gas in such a way that it will be affected by the velocity of flow, but not by pressure. In a preferred, exemplary form of the invention as described herein, a member which is movable in response to velocity of flow is mounted on a stem aligned with the direction of flow of medium so that the movable member can be activated, that is, moved along the stem in response to the velocity of flow, preferably against a force exerted by a biasing spring.

In one preferred exemplary form of the invention, it is embodied as a flow switch, there being a stem in the form of a tube having a magnetic reed switch within the tube. A movable member including a permanent magnet is mounted on the stem, and it actuates the reed switch when it is in proximity thereto. The invention may be adapted in other forms of instrumention as described herein.

In the light of the foregoing, it is a primary object of the invention to provide and make possible a simplified instrument which is responsive only to velocity of flow of a medium. The device is completely unresponsive to pressure of the medium. The instrument is thereby capable of indicating mass flow rate of the media.

A further object is to provide an instrument as set forth which is of extremely simple construction, but yet which is completely positive and reliable in operation. At the same time, it adapts itself ideally to microminiaturization and economy of fabrication and production.

Another object is to realize an instrument of this type which is extremely easy to install. Installation is simply by way of threading a mounting member of the instrument into a tapped hole.

Another object is to realize an instrument of this type, which is readily adaptable as an indicating meter, as a transducer, or otherwise.

BRIEF DESCRIPTION OF THE DRAWINGS

Further objects and additional advantages of the invention will become apparent from the following detailed description and annexed drawings, wherein:

FIG. 1 is an exploded perspective view of a preferred form of the invention, wherein it is adapted as a flow switch;

FIG. 2 is an illustrative view showing the form of the invention of FIG. 1 installed in a flow path;

FIG. 3 is a sectional view taken along the line 3—3 of FIG. 2;

FIG. 4 is a view similar to that of FIG. 2 wherein the instrument is adapted as a flow meter;

FIG. 5 is a detail view of parts of the form of the invention shown in FIG. 4; and FIG. 6 is a partial view similar to FIGS. 2 and 4, showing another form of the invention adapted as a transducer.

DESCRIPTION OF THE PREFERRED EMBODIMENT

Referring to FIGS. 1, 2, and 3, the instrument is shown adapted as a flow switch. Numeral 10 designates a threaded plug which may be made of a suitable plastic material having a square part 12 adapted to receive a wrench or other tool. Extending from plug 10 is a tube 14 having an upper part 16 of a slightly larger diameter, the tube being made of any suitable material which may be plastic or other material. If desired, it can be molded integrally with plug 10. Numeral 20 designates a sliding collar or shuttle having a conical part 22 and a short tubular part 24 having a bore 26 of a size so that the shuttle can freely slide on the tubular part 14. Numeral 30 designates a ring-shaped permanent magnet which can be an Alnico magnet, preferably cadmium plated, although other permanent magnets may be used. It has a bore 32 of a size that it can readily fit over tubular part 24 of collar or shuttle 20.

Shuttle 20 and the permanent magnet are retained on tubular stem 14 by way of a snap ring 40 that can fit into groove 42 on the end of stem 14.

Numeral 44 designates a coil spring fitted on tube 14 and retained at one end by portion 16 of the tube of larger diameter. The other end of the spring bears directly against the permanent magnet 30.

Mounted in tube 14 adjacent to its upper end is a reed switch 46 as may be seen in FIG. 3. Leads to the reed switch as desigated at 50 and 52 are preferably molded into plug 10.

FIG. 2 shows the threaded plug 10 threaded into a threaded opening 54 in a part of the fluid conveying passageway or enclosure 56. As may be observed, stem 14 is aligned with the direction of flow. The velocity of movement of the fluid medium causes movement of shuttle 20 along stem 14. The movement is reponsive to velocity alone and not pressure. The pressure of the fluid acts equally on the shuttle and permanent magnet in all directions; more particularly, pressure, if any, acts equally in both directions with respect to the axis of tubular support member 14 so that the instrument responds faithfully to velocity only. Depending on the velocity, that is, the mass rate of flow, the shuttle and permanent magnet will move to compress spring 44. When the permanent magnet reaches the proper position in proximity to reed switch 46, the switch will be actuated to close a circuit or open one, if desired. The instrument is ideally adapted to many different applications, such as for example, shutting off a gas valve in a gas fired heating system when there is no flow of water. Many different applications of the invention as a switch are possible.

As may be observed, the switch adapts itself ideally to micro-miniaturization; to being completely hermetically sealed; and to maximum ease of installation merely by way of threading the threaded plug into a tapped hole. Electronic parts are potted in.

FIGS. 4 and 5 show a modification of the invention adapted as a flow meter for indicating mass flow rate. In this form of the invention, instead of utilizing the reed switch, a thin stem 60 is provided that moves inside tube 14 and through a bore 62 in end plug 10. End plug 10 carries an extending glass tube 64 of small diameter resembling a thermometer tube and having graduations 66 on it. The end of stem 60 is in the form of a pointer 68 which moves adjacent graduations 66 to thereby indicate mass flow rate. The other end of the stem 60 is connected to a yoke 70 carried by the shuttle 20 as shown. As may be seen, the entire structure can be made very small and inexpensively, tube 64 being relatively short and being capable of being of a very small size like that of a thermometer tube, as stated, and carried directly by plug 10.

FIG. 6 shows another form of the invention which is like that of FIGS. 4 and 5 wherein the instrument is adapted as a transducer. In this form of the invention, there is provided within tube 64 a potentiometer, including a slide wire 72 and a sliding contact 74 attached to the end of stem 60, so that the contact can slide relative to slide wire 72 of the potentiometer. The parts are of microminiature size. Due to their small size, the slider can be made to slide substantially without friction against slide wire 72. Other forms of transducers can also be utilized, such as reactance or capacitance types wherein no friction whatever is involved which would offer resistance to movement of stem 60 and thereby having no effect on the reading of the instrument. The instrument can be adapted in types wherein a rotating pointer moves with respect to a dial face. Engagement between the sensitive element of the instrument and the pointer can be by way of very small magnets in proximity to each other. Then the zeroing adjustment can be by way of adjustment of position on one magnet or the other.

From the foregoing, those skilled in the art will readily understand the nature and construction of the invention and the manner in which it realizes and achieves all of the objectives as set forth in the foregoing, as well as its many additional advantages which are apparent from the detailed description.

The foregoing disclosure is representative of preferred forms of the invention and is to be interpreted in an illustrative rather than a limiting sense, the invention to be accorded the full scope of the claims appended hereto.

What is claimed is:

1. A fluid flow responsive device comprising:
a fluid flow conduit;
an elongated fixed guide extending substantially coaxially of said conduit;
a flow responsive element slidable along said guide and being spaced inwardly from the sides of said conduit sufficiently to substantially eliminate any pressure drop in fluid flowing in said conduit past said element whereby said element moves along said guide only in response to fluid flow in said conduit;
a permanent magnet carried by said element for movement therewith;
means yieldably urging said element and magnet to slide along said guide to an upstream position; and
a magnetically operable reed switch within said guide and responsive to said magnet when proximate thereto to actuate said switch to one of an open and closed condition.

2. A device as defined in claim 1 wherein said guide includes a threaded portion removably mounting the guide in a threaded opening in a wall of said conduit.

* * * * *